United States Patent [19]

Shibanai et al.

[11] 4,292,044
[45] Sep. 29, 1981

[54] SOLID FUEL

[75] Inventors: Ichiro Shibanai; Kouki Horikoshi, both of Tokyo; Nobuyuki Nakamura, Kunitachi, all of Japan

[73] Assignee: Kyoshin Co., Ltd., Tokyo, Japan

[21] Appl. No.: 137,322

[22] Filed: Apr. 4, 1980

Related U.S. Application Data

[63] Continuation-in-part of Ser. No. 50,989, Jun. 22, 1979, abandoned.

[30] Foreign Application Priority Data

Feb. 8, 1979 [JP] Japan .................... 54/12762

[51] Int. Cl.$^3$ .................................... C10L 5/00
[52] U.S. Cl. ..................... 44/1 R; 44/10 B; 44/15 C
[58] Field of Search ............ 44/1 R, 1 D, 10 A, 15 C, 44/25, 10 B

[56] References Cited

U.S. PATENT DOCUMENTS 3,635,684  1/1972  Seymour .................. 44/15 C
3,689,234  9/1972  Onozawa .................. 44/15 C

FOREIGN PATENT DOCUMENTS 1046250  10/1966  United Kingdom ............ 44/25

Primary Examiner—Carl F. Dees
Attorney, Agent, or Firm—Jordan and Hamburg

[57] ABSTRACT

A solid fuel includes a mixture of a liquid fuel and cyclodextrin or a cyclodextrin - containing decomposition product of starch and a second combustible substance such as pulp.

11 Claims, No Drawings

SOLID FUEL

This is a continuation-in-part application of Ser. No. 50,989 filed June 22, 1979 now abandoned.

DETAILED DESCRIPTION OF THE INVENTION

The present invention relates to a novel solid fuel formed by using as the starting material a liquid fuel such as crude oil, gasoline, kerosene, light oil or fuel oil.

Liquid fuels are advantageous in various points. For example, since the calorific value is very high, intended effects can be attained by using a light weight and small volume of a liquid fuel. Furtheremore, adjustment of combustion, such as ignition or fire extinguishing, can be performed very easily, and the thermal efficiency is very high. Because of these advantages, liquid fuels are especially important as fuels for various internal combustion engines. However, since risks of fire catching and explosion are involved in liquid fuel, prudent care should be taken for handling and storage of liquid fuels. Namely, liquid fuels are defective in that handling is very troublesome. Accordingly, it has been eagerly desired to develop a novel fuel which can be handled very easily while it retains advantages inherent of liquid fuels. We made researches with a view to stabilizing liquid fuels by forming clathrate compounds of liquid fuels with cyclodextrin, and we found that the stability of a liquid fuel can be remarkably improved by converting the liquid fuel into a clathrate compound by using cyclodextrin.

The present invention has now been completed based on this finding. According to the present invention, the above-mentioned defects of liquid fuels can be eliminated, and a solid fuel which can be handled very safely and easily can be prepared from a liquid fuel, handling of which is very troublesome and dangerous, by drying a composition comprising a mixture of a liquid fuel and cyclodextrin or a starch decomposition product containing cyclodextrin and a combustible substance such as pulp, chaff, sawdust or the like incorporated in said mixture.

In the present invention, as the liquid fuel, there can be used petroleum type fuels such as crude oil, gasoline, kerosene, light oil and fuel oil, and alcoholic fuels. Furtheremore, fat oils may be used as the liquid fuel. Cyclodextrin is formed by causing cyclodextrin glycosyltransferase produced by a microorganism belonging to the genus bacillus and having an optimum pH on the alkaline side, to act on starch. A starch decomposition product containing cyclodextrin is obtained as an intermediate product of the above reaction. This starch decomposition product is cheaper than cyclodextrin, and use of this starch decomposition product is preferred from the economical viewpoint. The process for the preparation of this starch decomposition product is disclosed in, for example, the specifications of Japanese Pat. Nos. 886,583 and 914,137 and Japanese Patent Publication No. 31223/78. A specific example of the preparation of this starch decomposition product will now be described.

The pH of a starch solution is adjusted to 10, and the solution is homogeneously gelatinized and cooled and is then reacted with cyclodextrin glycosyltransferase which is a fermentation product of a microorganism selected from the group consisting of Bacillus sp. No. 13, Bacillus sp. No. 17-1, Bacillus sp. No. 38-2, Bacillus sp. No. 135 and Bacillus sp. No. 169 and has an optimum pH on the alkaline side. The reaction liquid is heated to deactivate the enzyme, and the reaction liquid is cooled and the pH is adjusted to 5.0. Then, commercially available gluco amylase is added to decompose the unreacted substance.

Then, the reaction liquid is filtered according to a customary method to concentrate the reaction liquid so that the cyclodextrin concentration is higher than about 40%. A small amount of cyclodextrin is added as the seed to the concentrate and the concentrate is allowed to stand still, whereby cyclodextrin is precipitated. The precipitate is recovered by filtration and dried to obtain $\beta$-cyclodextrin. The filtrate obtained at this step is the intended starch decomposition product containing cyclodextrin.

The above-mentioned Bacillus sp. No. 13, Bacillus sp. No. 17-1, Bacillus sp. 38-2, Bacillus sp. 135 and Bacillus sp. No. 169 were deposited at Fermentation Research Institute, Agency of Industrial Science and Technology, with deposition numbers of FRI 611, FRI 612, FRI 614, FRI 617 and FRI 618, respectively.

A product obtained by refining the above-mentioned concentrate with an ion exchange resin and concentrating the refined product is marketed as a malt syrup containing cyclodextrin. In the present invention, this malt syrup can be used.

Cyclodextrin-containing products that can be used in the present invention are not limited to those prepared according to the above-mentioned methods. Products prepared according to other methods may be used. For example, a product obtained according to a method comprising adding cyclodextrin to a cyclodextrin-free starch decomposition product can be used as the cyclodextrin-containing starch decomposition product.

In the present invention, a combustible substance is used as a combustion improver. Any of substances having a combustion-improving property can be used. For example, pulp, chaff, sawdust and the like may be used.

The present invention will now be described in detail with reference to the following Examples that by no means limit the scope of the invention.

EXAMPLE I

To 300 g of kerosene was added 700 g of a cyclodextrin-containing malt syrup (Celdex CH-20 manufactured by Nippon Shokuhin Kako K. K. and having a cyclodextrin content of 15% by weight), and the mixture was agitated at room temperature for 3 hours. Then, 300 g of ground-wood pulp was added to the mixture and the resulting mixture was dried at 60° to 90° C. under reduced pressure with stirring to obtain a solid fuel.

The so obtained solid fuel was excellent in the ignition quality and combustibility, and even if this solid fuel was stored for a long time, no deterioration was caused.

EXAMPLE II

A solid fuel was obtained according to the same procedures as described in Example I except that $\alpha$-cyclodextrin was used instead of the cyclodextrin-containing malt syrup used in Example I. The properties of the obtained solid fuel were comparable or superior to those of the solid fuel obtained in Example I.

EXAMPLE III (1)

(a) A liquid mixture comprising 100 g of methanol and 200 g of crude oil was prepared.

(b) The pH of 15 l of a 4% (W/V) potato starch suspension (the amount of starch being 600 g) was adjusted to 10 by addition of caustic soda, and the starch was homogeneously gelatinized at 125° C. for 30 minutes. The gelatinized starch was cooled to 50° C. and 600 mg of cyclodextrin glycotransferase produced by Bacillus sp. 38-2 (deposited at Fermentation Research Institute with the deposition number of FRI 614) was added to the gelatinized starch and reaction was carried out at 50° C. for 30 hours.

After the reaction, the reaction mixture was heated at 100° C. for 5 minutes to deactivate the enzyme. Then, the reaction mixture was cooled to 55° C. and the pH was adjusted to 5.0 by hydrochloric acid. Then, 900 mg of gluco amylase (GSA-1 manufactured by Amano Seiyaku K. K.; 2000 units/g) was added to the reaction mixture and reaction was further conducted for 20 hours. The reaction mixture was decolorized according to a customary method and was filtered to concentrate the reaction mixture so that the solid content was 65%. Then, 500 mg of β-cyclodextrin was added to the concentrate and the mixture was allowed to stand still overnight in a cold chamber.

The formed precipitate of cyclodextrin was recovered by filtration and dried under reduced pressure to obtain 280 g of β-cyclodextrin.

(2)

A solid fuel was obtained according to the same procedures as described in Example I except that the liquid mixture prepared in (1)-(a) above was used instead of kerosene used in Example I and β-cyclodextrin prepared in (1)-(b) above was used instead of the cyclodextrin-containing malt syrup used in Example I.

(3)

A solid fuel was obtained according to the same procedures as described in Example I except that the liquid mixture prepared in (1)-(a) above was used instead of kerosene used in Example I and the filtrate left after filtration of the cyclodextrin precipitate in (1)-(b) above (having a solid content of 30%) was used instead of the cyclodextrin-containing malt syrup used in Example I.

Solid fuels obtained in (2) and (3) above were very excellent in the ignition quality and combustibility, and even if they were stored for a long time, no deterioration was caused. In case of the solid fuel prepared in (3) above, the manufacturing cost could be remarkably reduced because the filtrate which was to be used as the starting material for forming a cyclodextrin-containing malt syrup through decolorizing and concentration steps again was used. as the cyclodextrin-containing starch decomposition product.

EXAMPLE IV

The pH of 100 l of a 25% (W/V) starch suspension (the amount of starch being 25 Kg) containing 5 mM of calcium chloride was adjusted to 6.5, and a bacterium liquefaction type amylase (10,000 units per gram) was added to the starch suspension in an amount of 10 units per gram of starch. Liquefaction was carried out at 85° to 95° C. for 15 minutes and the reaction mixture was heated at 130° C. for 5 minutes to a liquefied starch having a D.E. (dextrose equivalent) value of 2.3.

Then, the liquefied starch was cooled to 60° C. and the pH was adjusted to 8.5 by addition of caustic soda. Then, 30 units per gram of starch of cyclodextrin glycosyltransferase (30,000 units per gram) produced by Bacillus sp. No. 38-2, which is an alkali-philic bacterium, and 10 Kg of kerosene were added to the liquefied starch, and reaction was carried out under agitation for 70 hours. Then, 10 Kg of powdered chaff was added to the reaction mixture and the resulting mixture was dried at 60° C. under reduced pressure with stirring to obtain about 55 Kg of a solid fuel.

EXAMPLE V

A liquefied starch having a D.E. value of 2.3 was prepared by treating 100 l of a 25% (W/V) starch suspension (the amount of starch being 25 Kg) containing 5 mM of calcium chloride in the same manner as described in Example IV was cooled to 45° C., and 50 units per gram of starch of cyclodextrin glycosyltransferase (10,000 units per gram) produced by *Bacillus mecerans* (IFO 3490) and 10 Kg of a mixture of methanol and crude oil were added to the liquefied starch. Reaction was carried out for 100 hours under agitation. Then, 10 Kg of powdered chaff was added to the reaction mixture, and the resulting mixture was dried under reduced pressure at 60° C. with stirring to obtain about 34 Kg of a solid fuel.

EXAMPLE VI

By a grinding roll, 50 Kg of barley was ground and impurities such as cellulosic materials were removed by sieving. Then, 100 l of water was added to ground barley and the mixture was heated at 60° C. The pH of the mixture was adjusted to 8.5 by addition of caustic soda, and 25 units per gram of ground barley of cyclodextrin glycosyltransferase (30,000 units per gram) produced by Bacillus sp. No. 38-2, which is an alkali-philic bacterium, and 10 Kg of kerosene were added to the mixture. Reaction was carried out for 50 hours with stirring. Then, 10 Kg of powdered chaff was added to the reaction mixture, and the resulting mixture was dried at 60° C. under reduced pressure with stirring to obtain about 40 Kg of a solid fuel.

When a base such as wax or paraffin is added to the solid fuel according to the present invention and the mixture is molded under heating, a solid fuel derived from a liquid fuel is obtained. When the solid fuel is molded under such conditions that a great number of voids are formed in the interior, the combustibility can be further improved.

The present invention may be applied as means for storing liquid fuels safely. More specifically, when use of the resulting solid fuel is not intended but safe storage of the liquid fuel alone is intended, the liquid fuel is mixed with cyclodextrin or a starch decomposition product containing cyclodextrin to form a clathrate compound of the liquid fuel. In this case, the combustible substance need not be added. By this method, the liquid fuel is stabilized and can be stored for a long time. If the clathrate compound is dipped in warm water, the liquid fuel is separated and it can be used singly.

As will be apparent from the foregoing explanation, according to the present invention, a liquid fuel which involves a risk of fire catching or explosion and requires troublesome operations in handling thereof can be formed into a solid fuel which can be handled very easily with safety and stored for a long time and which is excellent in the ignition quality and combustibility.

Accordingly, the present invention is very effective for the production of solid fuels. Furthermore, the present invention is very effective for storing liquid fuels safely and is very valuable as means for preservation of the petroleum resource, which is now a very important problem. Thus, the present invention makes great contribution to industries.

We claim:

1. A solid fuel comprising a mixture of a liquid fuel and cyclodextrin or a cyclodextrin-containing decomposition product of starch, which mixture also includes a second combustible substance and a base.

2. The solid fuel of claim 1, which has been shaped by thermoforming.

3. The solid fuel of claim 1 in which said liquid fuel is selected from the group consisting of hydrocarbon fuels, alcoholic fuels and fatty oil fuels.

4. The solid fuel of claim 1 in which said second combustible substance is selected from the group consisting of wood pulp, chaff and sawdust.

5. The solid fuel of claim 1 in which said base is wax.

6. A process for producing a solid fuel comprising the steps of mixing a liquid fuel with cyclodextrin or a cyclodextrin-containing decomposition product of starch to form an inclusion compound of the liquid fuel and cyclodextrin, and adding a second combustible substance and a base.

7. A process according to claim 6 comprising shaping the solid fuel by thermoforming.

8. A process according to claim 6 in which said liquid fuel is selected from the group consisting of hydrocarbon fuels, alcoholic fuels and fatty oil fuels.

9. A process according to claim 6 in which said second combustible substance is selected from the group consisting of wood pulp, chaff and sawdust.

10. A process according to claim 6 in which said base is wax.

11. A process for producing a solid fuel comprises the steps of:
   (a) adjusting the pH of 100 liters of a 25% (W/V) starch suspension containing calcium chloride to 6.5;
   (b) adding a bacterium liquefaction type amylase (10,000 units/gram) in an amount of 10 units/gram of starch;
   (c) heating the mixture at 85°–95° C. for 15 minutes and at 130° C for 5 minutes;
   (d) cooling the resulting liquefied starch to 60° C. and adjusting the pH to 8.5 by the addition of caustic soda;
   (e) adding 30 units per gram of starch of cyclodextrin glycosyltransferase (30,000 units/gram) and 10 kg. of kerosene;
   (f) agitating the mixture for 70 hours;
   (g) adding 10 kg of powdered chaff; and
   (h) drying the resulting mixture at 60° C. under reduced pressure with stirring.

* * * * *